United States Patent [19]
Abbott et al.

[11] Patent Number: 4,936,953
[45] Date of Patent: Jun. 26, 1990

[54] COLD TRAP VAPOR CONTROL DEVICE

[76] Inventors: John Abbott, 639 Bair Island Rd., Suite #105, Redwood City, Calif. 94063; William C. McGeehon, 20559 Cedarbrook Terr., Cupertino, Calif. 95014; Allan Maass, 485 Boynton Ave., San Jose, Calif. 95117

[21] Appl. No.: 356,641

[22] Filed: May 22, 1989

Related U.S. Application Data

[63] Continuation of Ser. No. 175,589, Mar. 24, 1988, abandoned, which is a continuation of Ser. No. 935,268, Nov. 26, 1986, abandoned.

[51] Int. Cl.$^5$ .......................... B01D 3/02; B01D 8/00
[52] U.S. Cl. .......................... 202/164; 159/DIG. 42; 202/185.4; 202/269
[58] Field of Search ............ 202/83, 180, 185.4, 202/190, 191, 259, 260, 269, 164; 196/102, 103, 138; 159/31, DIG. 42; 277/135; 165/169; 220/228; 122/34, 508; 126/381, 382

[56] References Cited

U.S. PATENT DOCUMENTS

| Re. 31,566 | 4/1984 | Langlitz et al. | 266/192 |
|---|---|---|---|
| 31,566 | 4/1884 | Langlitz et al. | 165/169 |
| 36,403 | 9/1862 | Grannis | 202/190 |
| 78,247 | 5/1868 | Berry et al. | 202/190 |
| 349,414 | 9/1886 | Sundstrom | 202/191 |
| 460,398 | 9/1891 | McGarvey | 202/190 |
| 744,367 | 11/1903 | De Lautreppe | 202/185.4 |
| 798,901 | 9/1905 | Hodges | 202/190 |
| 911,467 | 2/1909 | Blunden | 126/382 |
| 1,306,687 | 6/1919 | Doubleday | 202/190 |
| 1,359,276 | 11/1920 | Rushworth | 202/190 |
| 1,372,865 | 3/1921 | Crane | 202/180 |
| 1,419,894 | 6/1922 | Oliver | 202/190 |
| 1,511,435 | 10/1924 | Yaten | 126/382 |
| 1,686,418 | 10/1928 | Oliver | 202/190 |
| 1,812,516 | 6/1931 | Dooley | 202/190 |
| 2,599,451 | 6/1952 | Hickman et al. | 159/31 |
| 3,251,397 | 5/1966 | Lens | 202/174 |
| 3,298,929 | 1/1967 | Smith | 202/190 |
| 3,501,381 | 3/1970 | Delano | 202/83 |
| 3,798,902 | 3/1974 | Butter | 165/169 |
| 3,857,679 | 12/1974 | Allred | 422/249 |
| 3,870,605 | 3/1975 | Sakamoto | 202/190 |
| 4,089,750 | 5/1978 | Kirschman et al. | 202/190 |
| 4,457,805 | 7/1984 | Pastor | 202/83 |
| 4,687,550 | 8/1987 | Wong | 202/165 |

Primary Examiner—Joye L. Woodard
Attorney, Agent, or Firm—Lyon & Lyon

[57] ABSTRACT

A cold trap vapor control system for use in vapor control systems having a heat removal channel and a heat removal surface area arranged so that during operation a narrow or contoured path is formed for vapors therebetween such that condensation takes place in the path and condensate is thereby drained away from the trap, or utilized to improve vapor containment.

15 Claims, 1 Drawing Sheet

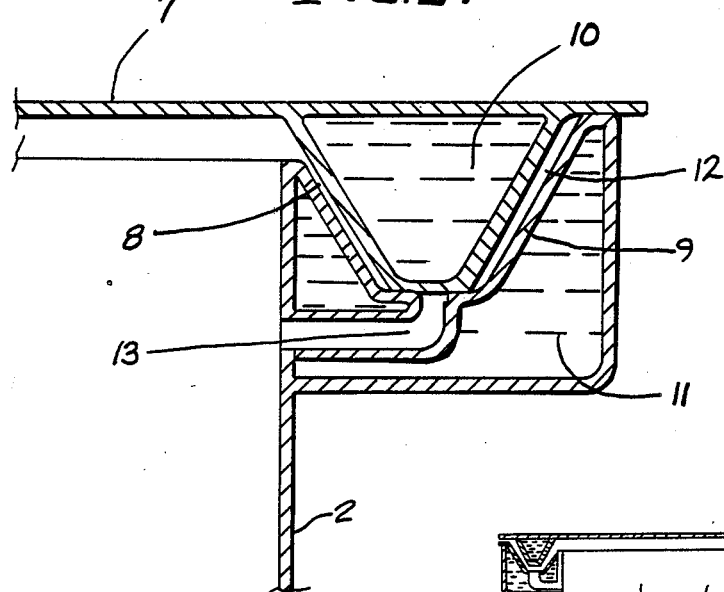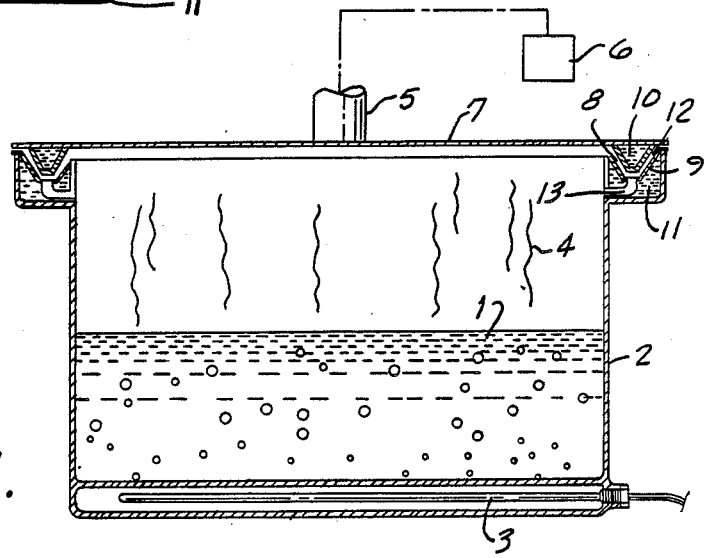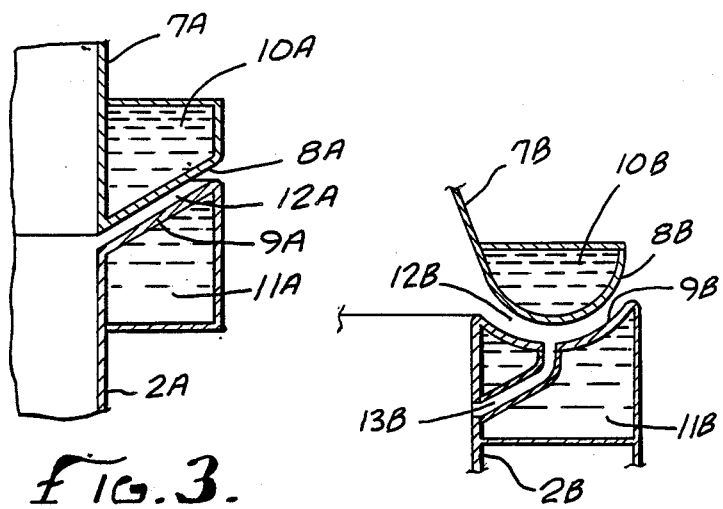

COLD TRAP VAPOR CONTROL DEVICE

This is a continuation of co-pending application Ser. No. 175,589 filed on 3/24/88 which is a continuation of application Ser. No. 935,268 filed Nov. 26, 1986, both of which are now abandoned.

BACKGROUND

This invention concerns a control device for evaporators and similar vapor handling systems. One such use is as a seal in a small scale solvent recovery system of the type shown in U.S. Pat. No. 4,457,805.

In evaporators in general, and heated vapor handling systems in particular, seals have a primary function to limit the flow of vapors, gases, or liquids and to restrict them to a particular area or volume for purposes of process requirements, cost, efficiency, safety or other reasons. Many types of physical seals are known and are all prone to defects and failures due to physical abuse, chemical attack, and thermal over limiting, etc.

Because of these problems with physical seals, there is a need for an improved type of seal which obviates these concerns when dealing with vaporized liquids.

SUMMARY OF THE INVENTION

The cold trap vapor seal of the present invention satisfies the aforementioned needs by providing a means to trap vaporized materials and maintain a seal between the inside of a container and the outside environment without the aforementioned problems associated with physical seals. The present invention provides a vapor seal by providing at the interface between the contained volume of the vapor container and the outside environment a nominally open path, typically convoluted, preferably having on either side of the path surfaces which are in thermal contact with a coolant source of sufficient capacity to cause the vaporized liquid to condense. Numerous configurations may be employed for the container interface surfaces. It is emphasized that virtually any shape may be employed so long as the cooling surface area is sufficient to condense essentially all of the vapor attempting to pass through the interface path for any anticipated vapor volume, heat energy application rate, coolant flow rate and other operating conditions.

The primary object of the present invention is to provide for a more effective seal for vapor containers, vapor handling systems and the like.

BRIEF DESCRIPTION OF THE DRAWINGS

FIG. 1 is a front cross section view of the preferred embodiment of the present invention;

FIG. 2 an enlargement of a portion of FIG. 1 showing details of the preferred embodiment;

FIG. 3 is a cross sectional view of an alternate embodiment of the present invention; and FIG. 4 is a cross sectional view of another alternate embodiment of the present invention.

DESCRIPTION OF THE PREFERRED EMBODIMENT

The present invention is described with reference being made to the accompanying drawings and specifically with respect to the preferred embodiment of the invention as shown in FIGS. 1 and 2.

Referring to FIG. 1, liquid 1 is shown in a boiler 2. Boiler 2 has a top, side walls and a bottom, which define a container which may, for example, be cylindrical. The liquid 1 is brought to a boil through activation of heater 3 normally located at the bottom of the boiler. The vapor 4 thus created from the boiling liquid rises by convection to the upper region of the boiler, where the majority of the vapor exits through outlet 5 which is shown in FIG. 1 as being positioned over the center of the container, or boiler 2, and then may be transported to another location 6. The other location 6 may be an external condensor unit, such as shown in U.S. Pat. No. 4,457,805, or it may include processing equipment that beneficially uses the vapor.

The outlet or aperture 5 can be located on boiler cover 7. At the perimeter, in the case of a cylindrical boiler, radially outward of the cover 7 and at the upper outer portion of the boiler 2 is located the cold trap vapor seal of the present invention. The seal has upper seal surface 8 located on the cover 7 and lower seal surface 9 positioned on the boiler 2. As shown in FIG. 2, the peripheral portion of the container or boiler 2 and the cover 7 form lower and upper boundaries of the path or conduit 12. Also, as may be seen, the surfaces 8 and 9 are in thermal contact with coolant channels 10 and 11, respectively. The surfaces 8 and 9 define a contoured path or conduit which may be v-shaped or of a truncated v-shape and which define a first aperture at 12 through which vapor attempts to escape from the inside of the boiler. At a low point in the interface path or conduit 12 is located a a second aperture defining a conduit, or drain 13 for return of condensate to the boiler 2 if desired, or for external collection and/or use. An enlargement of the features of the cold trap vapor seal are shown in FIG. 2 wherein the same components have the same numbers as in FIG. 1. Also in FIG. 2 the cover 7 is shown resting on the boiler 2 for support although a vapor-tight seal is not formed or necessary due to the present invention.

It is to be understood that heated vapors in the zone near the cold trap vapor seal of FIGS. 1 and 2 are those which would be normally present in any typical vapor handling system. The interface of the two surfaces 8 and 9 are maintained in a non-physically sealed relationship. It is to be understood, however, that these interface surfaces would be placed as close together as is economically reasonable for a greater effectiveness from the cold trap vapor seal principles operative in this design. The coolant fluid used in channels 10 and 11 act to absorb and remove sufficient input energy to reduce the vapors to a liquid state. A cold trap vapor seal is ideally designed such that coolant flow is introduced into both channels 10 and 11. The cold trap vapor seal is sized such that total surface area, coolant flow rate, thermal capacity, and temperature characteristics are such that the combined heat removal capability of the cold trap vapor seal may be equal to, greater than, or, in some applications, less than the heat input source capacity, as desired.

In operation, the cold trap vapor seal will produce condensate or regenerated fluids, at the seal interface. The condensate thus produced in the seal interface may then be collected and removed from the evaporator or may simply be returned to the evaporator for recycling, as shown in FIGS. 1 and 2 at drain 13. In some circumstances, it may be desirable to allow a portion of the condensed fluid to remain in the interface path or conduit 12 to act as a perfectly conforming liquid trap physical barrier that will further enhance the seal effectivity. In zero gravity applications of this cold trap vapor seal device it would be required to have some physical force input in order to collect and/or remove resultant fluids such as a wiper device or a directionalized flow of cool inert gas or other physical means in order to remove the fluid condensate at the seal interface. The outer lip defining the path or conduit 12 is higher than the inner lip so that should drain path 13 become clogged, condensate will flow back into the container volume rather than overflow to the outside.

In FIG. 3 an alternate embodiment of the cold trap vapor seal is shown wherein corresponding parts have been designated with the same reference numerals as in FIG. 1 except that letter "A" has been added to corresponding features. Thus, cover 7A has coolant channel 10A with upper surface 8A and boiler 2A has attached to it coolant channel 11A with heat transfer surface 9A. The heat transfer surfaces 8A and 9A define the straight path or conduit 12A through which the vapor passes. As may readily be seen in FIG. 3 there is no separate drain channel 13 for condensed fluid. Rather the path or conduit 12A is simply a straight inclined path leading downwardly and inwardly so that the condensate formed in the path or conduit 12A will, through force of gravity, drop down to surface 9A and flow into boiler 2A, rather than to change directions as in the interface path or conduit 12 of FIG. 1. As is readily apparent to those skilled in the art, the heat transfer medium in or comprising the channel 10, 10A and/or 11, 11A may be liquids such as water, polyglycols, or liquid sodium; or gases such as hydrogen, air or helium; or solids such as iron, copper, etc. Also, it is apparent that heat removal may be accomplished through all of or a portion of the periphery of the interface.

In FIG. 4 an alternate embodiment is disclosed, with corresponding components having the same reference numerals as in FIG. 1 except that a "B" has been added to corresponding features. Thus cover 7B has attached to it coolant channel 10B and surface 8B. Boiler 2B has attached to it coolant channel 11B and surface 9B, the surfaces 8B and 9B thereby forming a contoured path or conduit 12B having generally, a semi-circular configuration. At the bottom of surface 9B is formed a drain path 13B leading back into the interior of the boiler 2B. It is apparent that the opening of drain path 13B may be placed at other than the low point in the tortuous path or conduit 12B to provide barrier as described above. Such a physical barrier may also be formed simply by offsetting the height of the inner and outer lips of the path or conduit 12B so that the outer lip is higher than the inner lip, as shown, e.g., in FIGS. 1 and 2.

A more thorough understanding of the principles of operation of this cold trap vapor seal may be seen through example.

For instance, assume it is desired to extract ethanol from a fermented organic mass. Assume also that the heat input capacity $Q_1$, equals 34120 Btu/hour.

In this example assume that latent heat of vaporization, super heating, Reynolds numbers, condensate film factor and solution contaminates, etc. have no effect. Also assume that ethanol boils at 180° F. and that some condensate subcooling is required or desired, to about 150° F. Also, assume the coolant is water with an inlet temperature of 70° F. and a 10° F. rise in coolant temperature is acceptable.

The object of this example is to calculate the surface area required for a cold trap vapor seal of the present invention. The surface area required, A, may be expressed as follows:

$$A = \frac{Q}{U(LMTD)}$$

where
Q = heat input = 34120 Btu/hr.,
U = overall heat transfer coefficient for ethanol, and
LMTD = Log mean temperature difference.
The LMTD is calculated as follows:

$$LMTD = \frac{(GTTD - LTTD)}{\ln(GTTD/LTTD)}$$

where
GTTD = Greater Terminal Temperature Difference = 100° F. and
LTTD = Lesser Terminal Temperature Difference = 80° F.

When vapor temperature in (180° F.) minus condensate temperature out (150° F.) = 30° F., and the water temperature out (80° F.) minus the water temperature in (70° F.) = 10° F., then,

| 180° | 150° (solvent) |
|------|----------------|
| 80°  | 70° (coolant)  |
| 100° | 80°            | show the calculations for the terminal temperature differences. Substituting the appropriate values yields the following:

$$LMTD = \frac{100 - 80}{\ln(100/80)} = \frac{20}{\ln(1.25)}$$
$$= \frac{20.0}{.223} = 89.6° F.$$

LMTD may also be determined from log-log charts which have been prepared and are available and well-known. Use of such a chart in this example yields a LMTD of 90.0° F.

A third method may be used to determine LMTD. In this alternate method the smaller temperature difference is divided by the larger temperature difference 80/100 to yield on "S/L" value of 0.80. An "M" factors chart, commonly known and reproduced in part below from Perry's Chemical Engineers' Handbook, Sixth Edition, is then used to find the corresponding "M" value.

| "M" FACTORS FOR VALUES S/L ||
| S/L | M |
|-----|-----|
| 0.75 | 0.870 |
| .76 | .864 |
| .77 | .879 |
| .78 | .886 |
| .79 | .890 |
| .80 | .896 |
| .81 | .902 |
| .82 | .907 |
| .83 | .913 |
| .84 | .918 |

Using this "M" value and the relationship

LMTD = LTTD X M

LMTD = (100) (0.896) = 89.6° F.

As may be seen all these presently known methods yield essentially identical LMTD values.

The overall heat transfer coefficient, "U", is not easily explained and is usually determined empirically. A discussion of "U" as used in this invention is found in Perry's Chemical Engineering Handbook, Sixth Edition. For purposes of this example, the value of 80 has been used.

Thus, the original equation becomes $$A = \frac{Q}{U(LMTD)} = \frac{34120}{80(89.6)} = 4.76 \text{ in}^2$$

Assuming the boiler is a cylinder with a 10 inch diameter, then the cold trap vapor seal surface area is calculated by $$A = 4.76 \text{ in}^2 = \pi(R^2 - r^2)$$

where r=5.00 in.

Then $R^2 = \frac{A + \pi r^2}{\pi} = 26.52$

R=5.15
and R−r=5.15−5.00=0.15 inches.

Thus a flange which is 0.150 wide all around the cylinder has the capacity to extract all of the heat input (Q) and condense exiting vapors to a liquid.

This thermal, or cold trap acts as a seal or vapor control means because the heat energy extracted from the vapor causes it to condense to liquid form for recycle, use as a conforming containment surface, or extraction. It is also true that the collapsing volume of the fluid from the vapor to the liquid state creates a lessened, or lower, pressure condition in the cool trap zone, inhibiting outflow.

In this thermal seal, many fundamentals of heat transfer must be applied when considering and determining specific size and configuration. The length, width, total internal surface, surface configuration, coolant temperature and acceptable temperature rise are all components to be considered in a working application of this invention. As should be apparent this cold trap vapor seal is applicable with a condenser for materials, especially liquid recovery and is also usable separately in vessels that vaporize or boil liquids or for other purposes such as drawing off vapors to be used in some processes. It is also intended that this invention can be used with other vapor control equipment or components such that when the primary operating components of the equipment shut down and it is undesirable to have any vapor escape, then a cold trap vapor seal of the present invention may be employed. It is also possible to use a cold trap vapor seal of the present invention so as to allow a small amount of vapor escape when desired through the gap or to equalize pressure between the inside and outside environments. The cold trap vapor seal of the present invention may also be used as a standby system wherein the coolant for coolant channels 10 and 11 is activated only when some other sealing means is shut off or malfunctions. Also as is apparent the trap or path 12 formed by the surfaces 8 and 9 can be of any shape or configuration to provide an adequate coolant surface. Preferably the surface is such that there is no direct path for vapor to escape.

I claim:

1. A cold trap vapor control system comprising:
    a container having a bottom, side walls and an adjoining cover extending above the side walls of the container to define a fluid containing volume;
    the container also having at least one heat removal channel positioned on and outward of the side walls and adjacent to an upper region of the side walls, and further in thermal contact with a first heat removal surface also positioned on and outward of the side walls and adjacent to an upper region of the side walls;
    the container further including a second heat removal surface positioned on and outward of the cover, adjacent to and above the first heat removal surface;
    the first heat removal surface and the second heat removal surface forming a narrow first conduit therebetween, the first conduit having a first aperture in fluid communication with the fluid containing volume of the container and having a second aperture which defines a second conduit from the narrow first conduit to the fluid containing volume of the chamber; and
    means for removing heat from said second heat removal surface.

2. The cold trap vapor control device of claim 1 wherein the first conduit is of a convoluted shape.

3. The cold trap vapor control system of claim 1 wherein the second aperture is positioned at a low point in the first conduit.

4. The cold trap vapor control system of claim 1 wherein the first conduit is of a semi-circular shape.

5. The system of claim 1 wherein said means for removing heat from said second heat removal surface comprises a second heat removal channel positioned on and outward of the side walls, adjacent to an upper region of the side walls and in thermal contact with the second heat removal surface.

6. The system of claim 1 where the first conduit is of a v-shape.

7. The system of claim 1 where the first conduit is a truncated v-shape.

8. The system of claim 4 wherein the second aperture is positioned at the low point of the first conduit.

9. The cold trap vapor control system of claim 1 wherein the first heat removal surface is an external face of the at least one heat removal channel.

10. A cold trap vapor control system comprising:
    a container having a bottom, side walls and an adjoining cover extending above the side walls of the container to define a fluid containing volume;
    the container also having at least one heat removal channel positioned on and outward of the side walls and adjacent to an upper region of the side walls, and further in thermal contact with a first heat removal surface also positioned on and outward of the side walls and adjacent to an upper region of the side walls;
    the container further including a second heat removal surface positioned on and outward of the cover, adjacent to and above the first heat removal surface;
    the first heat removal surface and the second heat removal surface forming a narrow conduit therebetween, the conduit having a first aperture in fluid communication with the fluid containing volume of the container wherein the conduit is straight and extends upwardly and outwardly from an inward portion of the conduit to an outward portion of the conduit; and means for removing heat from said second heat removal surface.

11. A cold trap vapor control system, comprising, a container for a liquid subject to vaporization, having a cover and having a means for a majority of vapor product to exit the container and located in the center of the cover and above a normal liquid level within the container, said cover having a peripheral portion defining an upper boundary of a narrow conduit, a peripheral portion of the container extending from the inside of the container to the outside of the container defining a lower boundary of the narrow conduit, and means for cooling residual vapor product entering the conduit from the container wherein said means for cooling is attached to and is in thermal contact with the upper boundary and with the lower boundary, and said conduit having a first aperture and a second aperture with said first aperture opening to the inside of the container and said second aperture opening to a second conduit which opens to the inside of the container at a level beneath said first aperture.

12. In a small scale solvent recovery system having a cylindrical container, means for supplying heat to fluid to be vaporized in said cylindrical container, an adjoining cover positioned on said cylindrical container and having an aperture for passage of rising vapors therethrough, the improvement comprising a vapor control system having means for providing a vapor seal between the container of the system and the outside environment comprising a conduit from the inside of the container to the outside of the container, said conduit defined by surfaces positioned on the cover and the container and at the level of the container where the cover adjoins the container, and said conduit having at least one coolant channel in thermal contact with and positioned adjacent to least one of the surfaces.

13. The improved system of claim 12 wherein the conduit is convoluted.

14. The improved system of claim 12 wherein the conduit has at least one change of direction greater than 90°.

15. The improved system of claim 12 wherein the conduit has a means for draining condensed vapor into the container.

* * * * *